(12) United States Patent
Rolew et al.

(10) Patent No.: US 8,250,910 B2
(45) Date of Patent: Aug. 28, 2012

(54) METHOD FOR INCREMENTALLY ASCERTAINING A ROTATION ANGLE OF A SHAFT

(75) Inventors: Eduard Rolew, Stuttgart (DE); Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 406 days.

(21) Appl. No.: 12/521,132

(22) PCT Filed: Nov. 9, 2007

(86) PCT No.: PCT/EP2007/062148
§ 371 (c)(1),
(2), (4) Date: Dec. 11, 2009

(87) PCT Pub. No.: WO2008/080677
PCT Pub. Date: Jul. 10, 2008

(65) Prior Publication Data
US 2010/0107747 A1    May 6, 2010

(30) Foreign Application Priority Data

Dec. 27, 2006   (DE) .......................... 10 2006 061 575

(51) Int. Cl.
*G01M 15/00* (2006.01)
(52) U.S. Cl. ..................................... 73/114.26; 702/151
(58) Field of Classification Search ................ 73/114.26
See application file for complete search history.

(56) References Cited

U.S. PATENT DOCUMENTS

| 7,133,764 | B2 | 11/2006 | Kassner | |
|---|---|---|---|---|
| 7,216,030 | B2 | 5/2007 | Kassner | |
| 2006/0162701 | A1* | 7/2006 | Kassner | 123/479 |
| 2008/0010037 | A1* | 1/2008 | Hashizume | 702/151 |

FOREIGN PATENT DOCUMENTS

| DE | 102004011807 | 9/2005 |
|---|---|---|
| DE | 102004015037 | 10/2005 |
| DE | 102004061808 | 7/2006 |
| JP | 3-37518 | 2/1991 |
| JP | 9-32620 | 2/1997 |
| JP | 2004-257982 | 9/2004 |

OTHER PUBLICATIONS

International Search Report, PCT International Patent Application No. PCT/EP2007/062148, dated Apr. 28, 2008.

* cited by examiner

*Primary Examiner* — Lisa Caputo
*Assistant Examiner* — Roger Hernandez-Prewitt
(74) *Attorney, Agent, or Firm* — Kenyon & Kenyon LLP

(57) ABSTRACT

A method for incrementally ascertaining a rotation angle of a shaft, in particular of a crankshaft of an internal combustion engine, the shaft being connected to a sensor wheel having teeth and tooth gaps, and at least one sensor being associated with the sensor wheel, the sensor generating a square-wave signal as an output signal which may assume a first value or a second value, and a signal edge being associated with a tooth edge, and the position in time of a counteredge with respect to the edge encoding a direction of rotation, an assignment of a direction of rotation reversal point to a tooth of the sensor wheel or a tooth gap of the sensor wheel being encoded by the position in time of the counteredge with respect to the edge, the rotation angle being ascertained by adding an increment for each signal edge to a counter, after a direction of rotation reversal while a tooth passes the sensor, a half-increment, having a sign of the direction of rotation after the direction of rotation reversal, being incremented once and in the event of a direction of rotation reversal while a tooth gap passes the sensor, a half-increment, having a sign of the direction of rotation prior to the direction of rotation reversal, being incremented once.

6 Claims, 4 Drawing Sheets

METHOD FOR INCREMENTALLY ASCERTAINING A ROTATION ANGLE OF A SHAFT

FIELD OF THE INVENTION

The present invention relates to a method for incrementally ascertaining a rotation angle of a shaft, a method for encoding an output signal of a sensor, a sensor for a device for determining a rotation angle of a shaft, and a computer program for performing one of the above-mentioned methods.

BACKGROUND INFORMATION

Determining the crankshaft angle is one of the central tasks for controlling internal combustion engines. Conventional approaches use incremental sensors on the crankshaft and the camshaft. The typical sensor wheels having increment marks make cooperation of the crankshaft and camshaft sensors possible for determining the crankshaft angle. Another improvement on the control of an internal combustion engine is achieved if the crankshaft position is detected accurately when the internal combustion engine is stopped. This makes it possible to considerably speed up the restart of the internal combustion engine and to achieve a positive effect on comfort and exhaust gas emission. When the internal combustion engine is stopped, an oscillation of the crankshaft may occur, i.e., an alternating movement in both directions until standstill is reached. In general, sensors currently used in internal combustion engines are unable to recognize the direction of rotation and are therefore unable to reliably determine the absolute position of the crankshaft.

In principle, it is possible to add a direction of rotation recognition to the crankshaft angle sensor. At least two sensor elements are to be appropriately situated in a sensor housing for this purpose. The direction of rotation may be ascertained from the timing of the sensor signals. Sensors of this type having two sensor elements (transducer elements) are known as differential sensors. Sensors without direction of rotation recognition have one output, i.e., a total of three terminals (supply voltage, ground, signal output). Sensors having direction of rotation recognition often contain two signal outputs. In one specific embodiment, the signals of both sensor elements are output; in another specific embodiment, one output is provided for the tooth frequency information and the other output is provided for the direction of rotation information. It is furthermore conventional to select a signal encoding which transmits the tooth frequency and direction of rotation via a single terminal. A signal encoding of this type is performed via the signal pulse length. The signal is thus pulse-width modulated and contains two different pulse lengths PL1 and PL2, which represent the clockwise and counterclockwise rotation, respectively. Every time a rising tooth edge passes by, the output of pulse form PL1 or PL2 is triggered, depending on the direction of rotation.

It is problematic that, in the event of a direction of rotation reversal, while a tooth or a tooth gap passes the sensor, depending on the position of the direction of rotation reversal point, a systematic error may occur in the incremental angle determination.

SUMMARY

An object of the present invention is to provide a method of the above-mentioned type and a sensor and a computer program which make a more accurate determination of the absolute rotation angle of a shaft possible.

This object may be achieved by, for example, a method for incrementally ascertaining a rotation angle of a shaft, in particular of a crankshaft of an internal combustion engine, the shaft being connected to a sensor wheel having teeth and tooth gaps, and at least one sensor being associated with the sensor wheel, the sensor generating a square-wave signal as an output signal which may assume a first value and a second value, and a signal edge being associated with a tooth edge. The position in time of a counteredge with respect to the edge encodes a direction of rotation, an assignment of a direction of rotation reversal point to a tooth of the sensor wheel or a tooth gap of the sensor wheel being encoded by the position in time of the counteredge with respect to the edge, the rotation angle being ascertained by adding an increment for each signal edge to a counter, a half-increment, having a sign of the direction of rotation after the direction of rotation reversal, being incremented once after a direction of rotation reversal while a tooth passes the sensor. In the event of a direction of rotation reversal while a tooth gap passes the sensor, a half-increment, having a sign of the direction of rotation prior to the direction of rotation reversal, being incremented once. An increment here is a function of the number of increment marks on the sensor wheel; sensor wheels usually have a pitch of 6°; therefore the increment is also 6° in each case. Edges and counteredges are understood here as rising or falling edges of the output signal of the sensor; depending on the encoding, an edge may be either a rising or a falling edge; the same is true for the counteredge. If the edge is a rising edge, the counteredge is a falling edge and vice-versa. The above-mentioned object is also achieved by a method for encoding an output signal of a sensor of a device for determining a rotation angle of a shaft, in particular of a crankshaft of an internal combustion engine, the shaft being connected to a sensor wheel having teeth and tooth gaps, and at least one sensor being associated with the sensor wheel, the sensor generating a square-wave signal as an output signal, which may assume a first value or a second value, and a signal edge being assigned to a tooth edge, and the position in time of a counteredge with respect to the edge encoding a direction of rotation, additional information regarding the angular position of the direction of rotation reversal being encoded by the position in time of the counteredge with respect to the edge.

It may be provided that the additional information regarding the angular position of the direction of rotation reversal includes an assignment of a direction of rotation reversal point to a tooth of the sensor wheel or a tooth gap of the sensor wheel. The direction of rotation reversal point is the angle, for example, the crankshaft angle in the case of a crankshaft, at which the direction of rotation reversal occurs. Preferably, it is furthermore provided that both the direction of rotation and the assignment of the direction of rotation reversal point to a tooth or a tooth gap are encoded via the pulse width of the sensor output signal. The sensor output signal preferably includes four different pulse widths using which two different directions of rotation and the two options for the direction of rotation reversal, namely the direction of rotation reversal during a tooth or a tooth gap, are encoded.

The above-mentioned object is also achieved by a sensor for a device for determining a rotation angle of a shaft, in particular of a crankshaft of an internal combustion engine, having means for encoding an output signal of the sensor (6), the shaft being connected to a sensor wheel having teeth and tooth gaps, and at least one sensor being associated with the sensor wheel, the sensor generating a square-wave signal as an output signal, which may assume a first value or a second value, one of the signal edges being assigned to a tooth edge, and the position in time of a signal counteredge with respect to the signal edge encoding a direction of rotation, additional information regarding the angular position of the direction of rotation reversal being encoded by the position in time of the counteredge with respect to the edge. It is preferably provided that the sensor is a differential sensor having two sensor elements.

The above-described object may also be achieved via a computer program having program code for carrying out all steps of a method according to the present invention when the program is executed on a computer.

BRIEF DESCRIPTION OF THE DRAWINGS

An exemplary embodiment of the present invention is explained in greater detail below.

DETAILED DESCRIPTION OF EXAMPLE EMBODIMENTS

Figure 1:
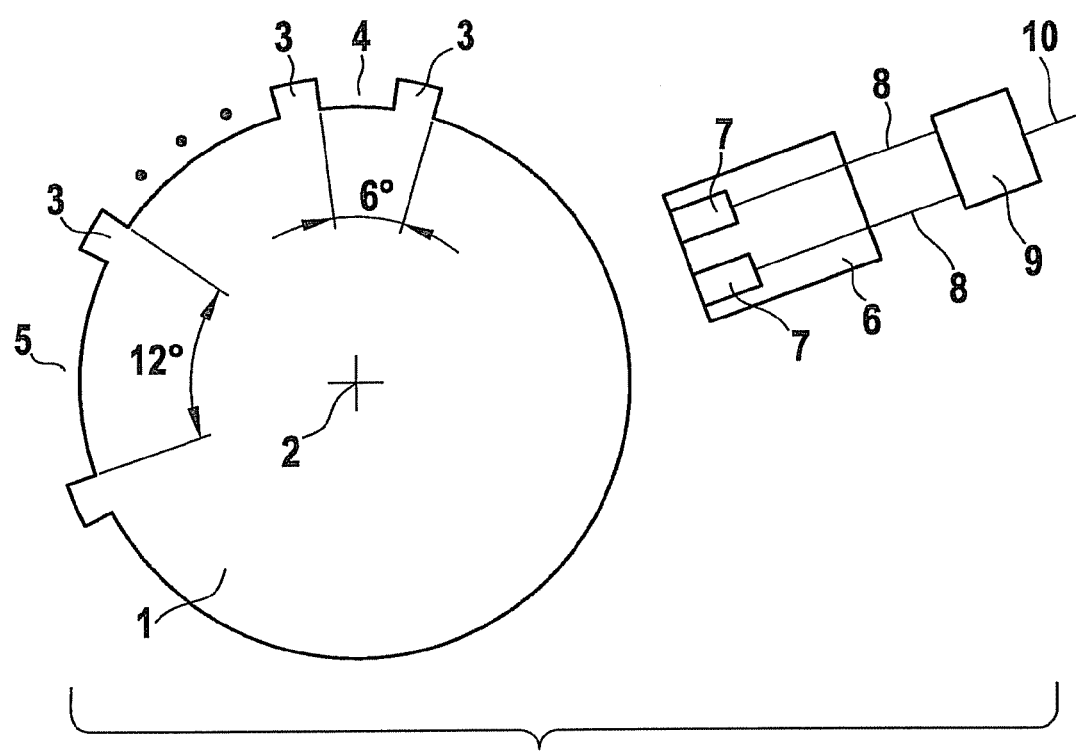
FIG. 1 shows a schematic drawing of a sensor wheel having an associated sensor.

FIG. 1 shows a schematic drawing of a conventional sensor wheel 1, which is connected to a crankshaft of an internal combustion engine, not depicted here, and rotates about an axis 2 at a rotation of the crankshaft. Sensor wheel 1 has sensor wheel marks (markings), which are formed by an alternating arrangement of teeth 3 and tooth gaps 4. The distance between consecutive pairs of teeth 3 and tooth gaps 4 is 6°. Teeth 3 and tooth gaps 4 may extend over a same angular range of 3°, but they may also be pitched unevenly, for example, by a tooth 3 covering an angular range of 2° and a tooth gap 4 covering an angular range of 4°. A sensor wheel gap 5 is formed by omitting one tooth 3, thus forming a sensor wheel gap 5 having an angle of 12°.

A sensor 6 is associated with sensor wheel 1. Sensor 6 includes two sensor elements 7, which may be Hall elements, inductive sensors, or the like, for example. Sensor elements 7 deliver electrical signals via signal lines 8, from which a differential signal is formed in an analyzer logic 9, the differential signal being transmitted to a control unit (not depicted) of the internal combustion engine via a signal line 10. The passage of teeth 3 and tooth gaps 4 past sensor elements 7 generates voltage changes at the outputs of sensor elements 7, which are relayed to analyzer logic 9 via signal lines 8. Sensor elements 7 are situated offset in the peripheral direction of sensor wheel 1, so that a tooth 3 or a tooth gap 4 passes by one of the two sensor elements 7 and then by the other of the two sensor elements 7 with a time offset as sensor wheel 1 rotates.

Typically, of the rising and falling edges only the rising edges are used, namely the edges at the transition from a tooth gap 4 to a tooth 3. The falling edge is not used. The rising edge will be hereinafter understood as a synonym for a transition from a tooth gap 4 to a tooth 3, which is converted into an appropriate electrical signal by sensor 6. Similarly, a falling edge is understood as the transition from a tooth 3 to a tooth gap 4, this transition being again converted into an electrical signal by sensor 6. Whether the electrical signal now transitions, at a rising edge, from high to low or from low to high, depends on the electrical configuration; the essential fact here is not the electrical definition of the rising and falling edge, but the assignment of the electrical signal to the geometric transition from tooth to tooth gap.

Figure 2:
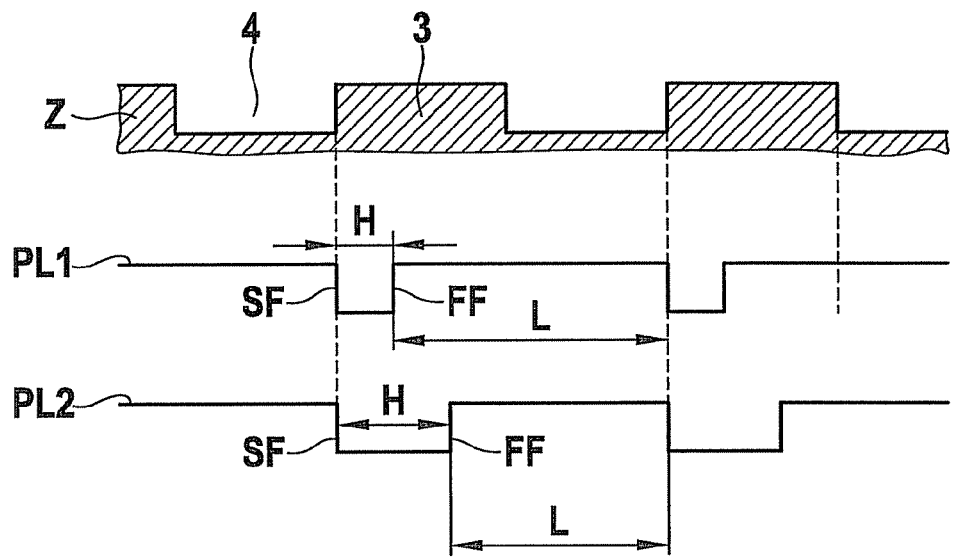
FIG. 2 shows signals having variable pulse lengths.

Since, for reasons of accuracy, only the rising edges are analyzed by the downstream control unit functions, the falling edge is used for encoding the direction of rotation of the crankshaft. One conventional approach for transmitting this information to an engine control unit is a variable pulse length such as is illustrated in FIG. 2. The direction information is therefore transmitted by the pulse length of the transmitting signal. Rising edges SF are transmitted without delay or further processing of the signal, i.e., in the case of a differential sensor, as soon as a tooth 3 of sensor wheel 1 has passed by approximately the center of sensor 6, the rising edge is transmitted on the signal line. Falling edge FF transmits only the information regarding the direction of rotation. The ratio of the values high H to low L is elucidated in FIG. 2. The signal between a rising edge SF and a falling edge FF is high value H; the signal between a falling edge FF and a rising edge SF is low value L. Line Z shows part of a processing of the sensor wheel, in which the signal labeled PL1 in FIG. 2, having a pulse-width ratio P=(time period of high value H) divided by (time period of low value L), results in a value considerably less than one; signal PL2 depicted below it results in a value considerably greater than one for the pulse-width ratio. Due to the different pulse-width ratios P=H/L, information regarding the direction of rotation may thus be transmitted by sensor 6 to a control unit.

Figure 3:
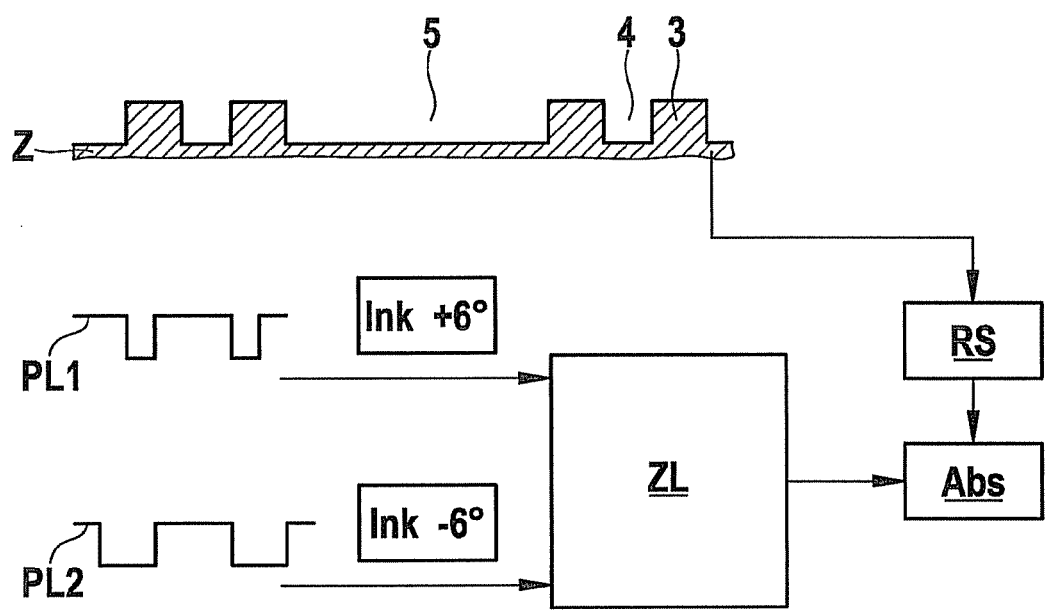
FIG. 3 shows a schematic drawing for determining the absolute crankshaft angle.

In the following figures, the pulse lengths are to be understood as the time of the signal at the low level; of course, the signal may also be assigned to the other tooth edge; the pulse length may also be defined as the time period at the high signal level. Strictly speaking, the period of the sensor signal is furthermore equal to the period of the tooth signal; only the duty factor is a function of the direction of rotation. The entire signal processing is integrated together in an integrated circuit having the sensor elements (transducer elements) and is already built into the speed sensor. FIG. 3 shows a schematic drawing for determining the rotation angle of the crankshaft, which is the absolute crankshaft angle Abs. If sensor wheel gap 5 or symmetry gap 11 in the case of an asymmetric pitch of sensor wheel 1 is recognized, rotation angle Abs is set at a 0° crankshaft angle by a module RS. Rotation angle Abs is formed incrementally by a counter ZL in that, with each rising edge, when a signal PL1 is applied according to FIG. 2, the counter is increased by an increment Ink of +6° and when signal PL2 is applied according to FIG. 2, counter ZL is reduced by an increment Ink of −6° at the rising edge SF. When the direction of rotation of the crankshaft is reversed, the assignment of the rising and falling edges to the tooth edges is changed. If the direction of rotation changes, the previous tooth edges, which are assigned to a rising edge of the electrical signal, become falling edges; a falling edge of the electrical signals is assigned in a corresponding manner. In the event of a direction of rotation reversal, the value of the crankshaft angle is corrected once by an increment of 3° in order to take the shift of the signal-triggering tooth edge into account. The correction in the event of a direction of rotation reversal on one tooth is −3°. The angle counter then contains the values 3°, 9°, 15°, 12°, 6°, . . . , a direction of rotation reversal having occurred here between the positions 15° and 12°. In the event of a direction of rotation reversal in a gap, the correction is +3°; the angle counter then contains the values 3°, 9°, 15°, 18°, 12°, 6°, . . . , a direction of rotation reversal having occurred here between the positions 15° and 18°. To make correct determination of rotation angle Abs possible, an extension of the conventional information processing is provided according to an example embodiment of the present invention from the crankshaft angle sensor to the engine control unit. The use of two additional pulse lengths PL3 and PL4, which contain, in an encoded form, the information about the location of the direction of rotation reversal, is provided according to the present invention.

Figure 4:
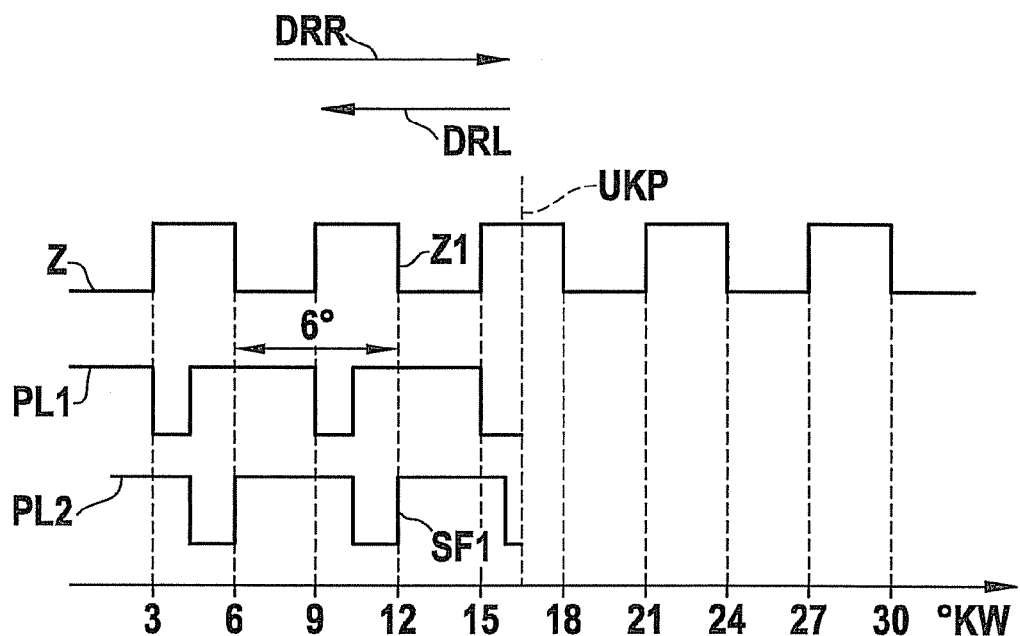
FIG. 4 shows schematic drawings of the signals PL1 and PL2 at the direction of rotation reversal.
Figure 5:
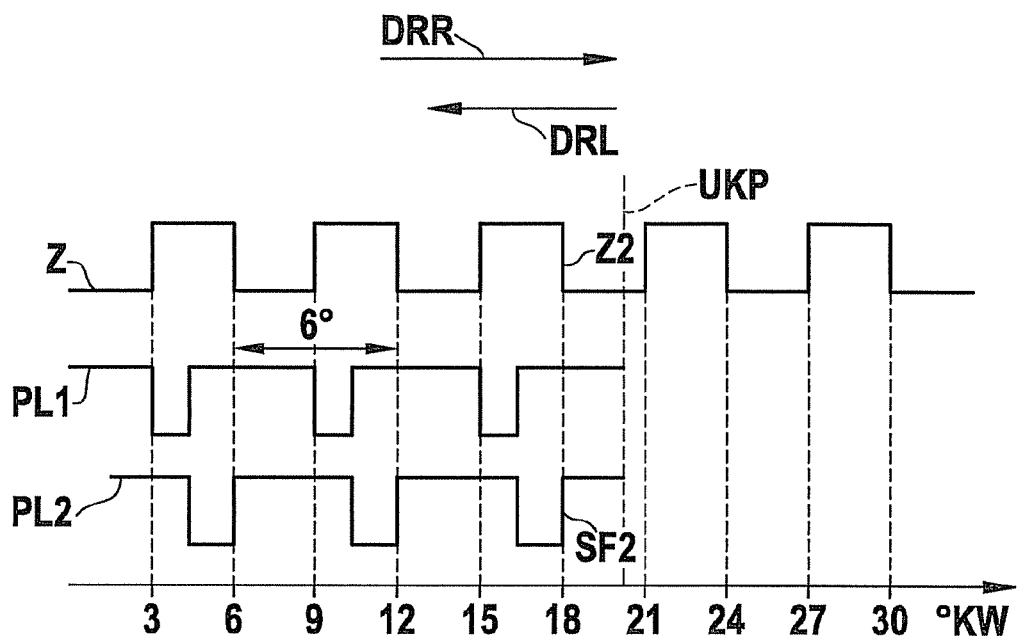
FIG. 5 shows schematic drawings of the signals PL1 and PL2 at the direction of rotation reversal.
Figure 6:
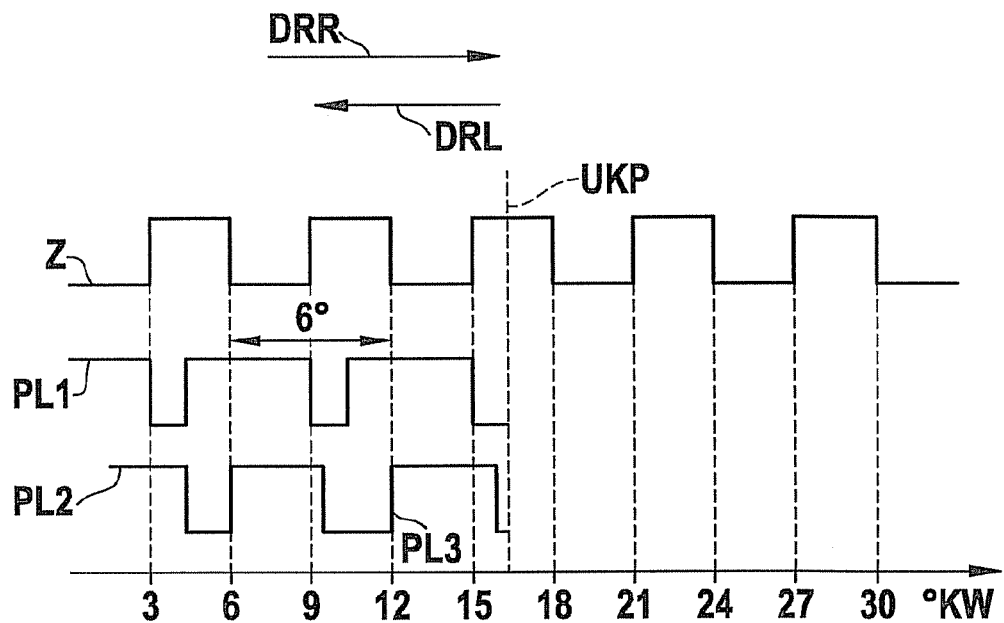
FIG. 6 shows schematic drawings of the signals PL1, PL2, PL3, and PL4 at the direction of rotation reversal.
Figure 7:
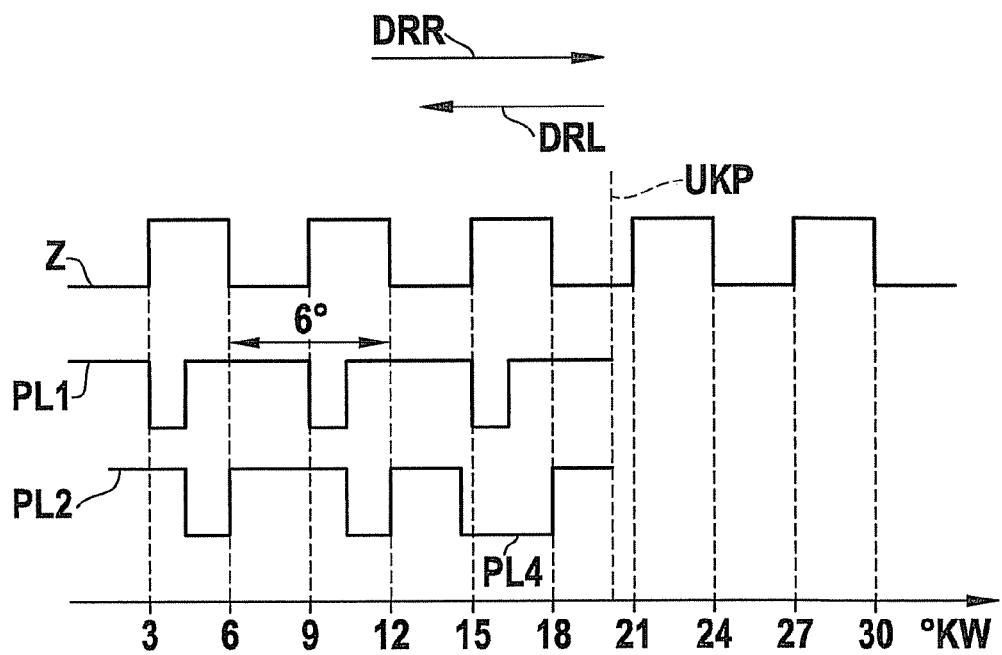
FIG. 7 shows schematic drawings of the signals PL1, PL2, PL3, and PL4 at the direction of rotation reversal.

FIGS. 4 and 5 show schematic drawings of signals PL1 and PL2 at the direction of rotation reversal, FIG. 4 representing a direction of rotation reversal during a tooth, and FIG. 5 representing the direction of rotation reversal during a tooth gap. In FIG. 4, as in FIG. 5, it is assumed that the direction of rotation is initially clockwise DRR, and it is reversed at a reversal point UKP to a counterclockwise direction of rotation DRL. Initially, a rising edge SF of signal PL1 is triggered at 3°, 9°, and 15°, each of which increases counter ZL by an increment of +6° according to FIG. 3. In FIG. 5, a direction of rotation reversal occurs at an approximately 16° crankshaft angle, i.e., while sensor 6 is detecting a tooth 3. The next following rising edge, which is labeled SF1 in signal PL2, is thus not triggered until the tooth labeled Z1 in FIG. 4 is detected. In the related art, the counter, standing at a 15° crankshaft angle, is now incremented by −6°, so that a value of a 9° crankshaft angle results instead of a correct value of a 12° crankshaft angle. Therefore, the increment is set once at −3° instead of −6°. FIG. 5 shows a direction of rotation reversal during a tooth gap. Also in this case, the direction of rotation is initially assumed to be clockwise DRR, counter ZL being incremented by an increment of 6° by signal PK1 at a 3°, 9°, and 15° crankshaft angle. The direction of rotation reversal occurs during a tooth gap at an approximately 20° crankshaft angle. At this moment, counter ZL stands at an 18° crankshaft angle. The next increment due to signal PL2 is triggered in this case by tooth edge Z2, which is assigned to rising edge SF2 of signal PL2. Counter ZL is now incremented by +3° by signal edge SF2. FIGS. 6 and 7 show the extension according to the present invention of the signal of sensor 6 by two further pulse lengths PL3 and PL4. Pulse length PL3 is transmitted in the event of a direction of rotation reversal during a tooth; pulse length PL4 is transmitted in the event of a direction of rotation reversal during a tooth gap. If pulse length PL3 is transmitted, counter ZL is incremented by −3°; if pulse length PL4 is transmitted, counter ZL is incremented by +3°. Pulses PL3 and PL4 are transmitted once immediately after the direction of rotation reversal, after which pulses PL1 or PL2, depending on the direction of rotation, are applied again.

What is claimed is:

1. A method for incrementally ascertaining a rotation angle of a crankshaft of an internal combustion engine, the shaft being connected to a sensor wheel having teeth and tooth gaps, and at least one sensor being associated with the sensor wheel, the method comprising:
generating, by the sensor, a square-wave signal as an output signal which assumes a first value or a second value;
assigning a signal edge to a tooth edge, a position in time of a counteredge with respect to the edge encoding a direction of rotation, and an assignment of a direction of rotation reversal point to a tooth of the sensor wheel or a tooth gap of the sensor wheel being encoded by the position in time of the counteredge with respect to the edge; and
ascertaining the rotation angle by adding an increment to a counter for each signal edge;
wherein, after a direction of rotation reversal while a tooth passes the sensor, a half-increment, having a sign of the direction of rotation after the direction of rotation reversal, is incremented once, and in an event of a direction of rotation reversal while a tooth gap passes the sensor, a half-increment, having a sign of the direction of rotation prior to the direction of rotation reversal, is incremented once.

2. A method for encoding an output signal of a sensor of a device for determining a rotation angle of a crankshaft of an internal combustion engine, the shaft being connected to a sensor wheel having teeth and tooth gaps, and at least one sensor being associated with the sensor wheel, comprising:
generating, by the sensor, a square-wave signal as an output signal, which assumes a first value or a second value; and
assigning a signal edge to a tooth edge, and a position in time of a counteredge with respect to the edge encoding a direction of rotation;
wherein:
additional information regarding an angular position of a direction of rotation reversal is encoded by the position in time of the counteredge with respect to the edge; and
the additional information regarding the angular position of the direction of rotation reversal includes an assignment of a direction of rotation reversal point to a tooth of the sensor wheel or a tooth gap of the sensor wheel.

3. A method for encoding an output signal of a sensor of a device for determining a rotation angle of a crankshaft of an internal combustion engine, the shaft being connected to a sensor wheel having teeth and tooth gaps, and at least one sensor being associated with the sensor wheel, comprising:
generating, by the sensor, a square-wave signal as an output signal, which assumes a first value or a second value; and
assigning a signal edge to a tooth edge, and a position in time of a counteredge with respect to the edge encoding a direction of rotation;
wherein:
additional information regarding an angular position of a direction of rotation reversal is encoded by the position in time of the counteredge with respect to the edge; and
both the direction of rotation and the assignment of the direction of rotation reversal point to a tooth or a tooth gap are encoded via the pulse width of the sensor output signal.

4. A method for encoding an output signal of a sensor of a device for determining a rotation angle of a crankshaft of an internal combustion engine, the shaft being connected to a sensor wheel having teeth and tooth gaps, and at least one sensor being associated with the sensor wheel, comprising:
generating, by the sensor, a square-wave signal as an output signal, which assumes a first value or a second value; and
assigning a signal edge to a tooth edge, and a position in time of a counteredge with respect to the edge encoding a direction of rotation;
wherein:
additional information regarding an angular position of a direction of rotation reversal is encoded by the position in time of the counteredge with respect to the edge; and
the output signal includes four different pulse widths.

5. A sensor for determining a rotation angle of a crankshaft of an internal combustion engine, comprising:
a sensor wheel having teeth and tooth gaps, the sensor wheel connected to the crankshaft; and at least one sensor associated with the sensor wheel, the sensor adapted to generate a square-wave signal having signal edges as an output signal, the square-wave signal assuming a first value or a second value, one of the signal edges being assigned to a tooth edge, a position in time of a signal counteredge with respect to the signal edge encoding a direction of rotation;

wherein:
additional information regarding an angular position of a direction of rotation reversal is encoded by the position in time of the counteredge with respect to the edge; and the sensor is a differential sensor having two sensor elements.

6. A non-transitory, computer-readable data storage medium storing a computer program, the computer program including program code which, when executed by a processor, causes the processor to perform the steps of a method for incrementally ascertaining a rotation angle of a crankshaft of an internal combustion engine, the shaft being connected to a sensor wheel having teeth and tooth gaps, and at least one sensor being associated with the sensor wheel, the method comprising:

generating, by the sensor, a square-wave signal as an output signal which assumes a first value or a second value;

assigning a signal edge to a tooth edge, a position in time of a counteredge with respect to the edge encoding a direction of rotation, and an assignment of a direction of rotation reversal point to a tooth of the sensor wheel or a tooth gap of the sensor wheel being encoded by the position in time of the counteredge with respect to the edge; and ascertaining the rotation angle by adding an increment to a counter for each signal edge;

wherein, after a direction of rotation reversal while a tooth passes the sensor, a half-increment, having a sign of the direction of rotation after the direction of rotation reversal, is incremented once, and in an event of a direction of rotation reversal while a tooth gap passes the sensor, a half-increment, having a sign of the direction of rotation prior to the direction of rotation reversal, is incremented once.

* * * * *